(12) United States Patent
Yano et al.

(10) Patent No.: US 8,590,509 B2
(45) Date of Patent: Nov. 26, 2013

(54) SPEED GOVERNOR OF ENGINE

(75) Inventors: Takahiro Yano, Kakogawa (JP); Michio Hirano, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 193 days.

(21) Appl. No.: 13/224,688

(22) Filed: Sep. 2, 2011

(65) Prior Publication Data

US 2012/0055447 A1    Mar. 8, 2012

(30) Foreign Application Priority Data

Sep. 6, 2010   (JP) ................................ P2010-198946

(51) Int. Cl.
*F02D 31/00* (2006.01)
*F02D 39/02* (2006.01)

(52) U.S. Cl.
USPC .......................................... 123/363; 123/400

(58) Field of Classification Search
USPC ............. 123/363, 400, 364, 379, 192.2, 58.1
See application file for complete search history.

(56) References Cited

U.S. PATENT DOCUMENTS

| 2,259,693 | A | * | 10/1941 | Hogeman | 123/373 |
| 3,217,700 | A | * | 11/1965 | Huse | 123/366 |
| 4,608,949 | A | * | 9/1986 | Nakano et al. | 123/73 A |
| 5,497,747 | A | * | 3/1996 | Nakano et al. | 123/363 |
| 6,957,639 | B2 | * | 10/2005 | Yamada et al. | 123/195 AC |
| 2004/0187811 | A1 | * | 9/2004 | Yamada et al. | 123/58.1 |

FOREIGN PATENT DOCUMENTS

JP            2000-88057          3/2000

* cited by examiner

*Primary Examiner* — Mahmoud Gimie
(74) *Attorney, Agent, or Firm* — Wenderoth, Lind & Ponack, L.L.P.

(57) ABSTRACT

A speed governor is used with an engine having a crankshaft and a balancer shaft arranged substantially in parallel to the crankshaft, in which a drive gear provided in the crankshaft and a driven gear provided in the balancer shaft are meshed with each other so as to transmit mechanical power. The speed governor includes a plurality of flyweights pivotally supported on the driven gear of the balancer shaft by the plurality of support pins. The driven gear has a recess portion on an end surface thereof, and the support pins supporting the flyweights are arranged in the recess portion. Each of the support pins has two ends in a longitudinal direction and through holes are respectively located at the ends of the support pins.

4 Claims, 18 Drawing Sheets

SPEED GOVERNOR OF ENGINE

BACKGROUND OF THE INVENTION

1. Field of the Invention

The present invention relates to a speed governor of an engine, particularly to a mechanical type speed governor provided with flyweights.

2. Description of the Prior Art

In a mechanical type speed governor of an engine, a plural of flyweights is opened or moved outward in the radial direction by centrifugal force, whereby a throttle opening position or an amount of fuel can be controlled. As a support structure of the flyweight, for example, there is a conventional structure in which the flyweight is pivotally supported on a gear provided on a cam shaft via a support pin or the like. According to this structure, there is no need for newly providing a governor shaft and governor drive gears. However, there is a case where a speed governor cannot be provided on the cam shaft due to various devices installed in the cam shaft or a shape of the cam shaft itself.

In an utility engine for agriculture described in Japanese Patent Laying-Open No. 2000-88057, one end of a crankshaft serves as a direct output shaft part, and furthermore, a flywheel, a recoil starter, and the like are installed in the other end of the crankshaft. Thus, in terms of a space or a structure, it is difficult to provide the speed governor on the crankshaft. Therefore, as shown in FIG. 21, a governor shaft 101 is newly arranged in parallel to a crankshaft 100, a driven gear 102 exclusive to the speed governor is provided on this governor shaft 101, and further, a drive gear 103 to be meshed with the driven gear 102 is provided on the crankshaft 100, so that a flyweight (not shown) for the speed governor is supported on the driven gear 102.

When the governor shaft, the driven gear, and the drive gear exclusive to the speed governor are provided as in the conventional example, the number of parts is increased, time and efforts are required for an assembling task, and size of crankcase and the engine is increased.

An object of the present invention is to provide a speed governor of an engine which facilitates assembling the speed governor into the engine without newly providing a governor shaft and governor drive gears, so as to reduce the number of parts of the engine and decrease size of the engine.

SUMMARY OF THE INVENTION

In order to solve the above problem, the present invention provides a speed governor of an engine having a crankshaft and a balancer shaft arranged substantially in parallel to the crankshaft, in which a drive gear provided on the crankshaft and a driven gear provided on the balancer shaft are meshed with each other so as to transmit mechanical power, the speed governor including a plurality of flyweights pivotally supported on the driven gear of the balancer shaft via a plurality of support pins, and an interlock mechanism for coupling the plurality of flyweights to a fuel feed portion for feeding fuel to a combustion chamber of the engine.

In the present invention, the speed governor with the above configuration may be further provided with the following configuration (a) or (b).

(a) A recess portion is formed on an end surface of the driven gear, and the support pins supporting the flyweights are arranged in the recess portion. In this case, preferably, the recess portion is formed into an annular shape substantially concentric to the driven gear.

(b) One end of the balancer shaft in the axial direction is supported on a side wall of a crankcase, the other end of the balancer shaft is supported on a crankcase cover fastened to a side surface of the crankcase in the axial direction, and an actuating member of the interlock mechanism actuated by pivot of the flyweights is supported on the crankcase cover.

(1) According to the present invention, an attachment mechanism and a drive mechanism of the speed governor are formed by utilizing the existing balancer shaft, the drive gear for balancer and the driven gear for balancer. Thus, there is no need for newly providing a governor shaft, a drive gear, and a driven gear exclusive to the speed governor, and the number of parts for the speed governor can be reduced and size of the crankcase can be decreased.

(2) With the above configuration (a), the support pins for the flyweights are arranged in the recess portion of the driven gear. Thus, in comparison to a structure in which boss portions for supporting the flyweights are formed on an end surface of the gear as in the conventional example, a projecting amount of the flyweights from the end surface of the driven gear is reduced, so that size of the speed governor can be decreased. A long distance from the support pins to gravity centers of the flyweights can be ensured, and sufficient centrifugal force can be generated. Thus, size of the flyweights themselves can be decreased.

(3) Since the recess portion for attaching the support pins is formed into an annular shape, the recess portion can be cut at the same time as a lathing work of the driven gear, so that a working process can be reduced. The recess portion is formed on the entire periphery of the end surface of the driven gear. Thus, a thickness reducing effect can be obtained, so that weight of the driven gear can be reduced.

(4) According to the above configuration (b), the driven gear, the flyweights, and the like can be attached to the balancer shaft before attaching the crankcase cover to the crankcase. Thus, the crankcase cover can be attached in a state that the driven gear is not provided on the side of the crankcase cover. That is, at the time of attaching the crankcase cover, the crankcase cover can be attached in a state that the driven gear, the flyweights, and the like on the balancer shaft can be visually recognized, so that an assembling task of the speed governor is easily performed.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

[First Embodiment of the Invention]

FIGS. 1 to 17 show an engine with an inclined cylinder according to a first embodiment of the present invention. The embodiment of the present invention will be described based on these figures.

(Configuration of Entire Engine)

Figure 1:
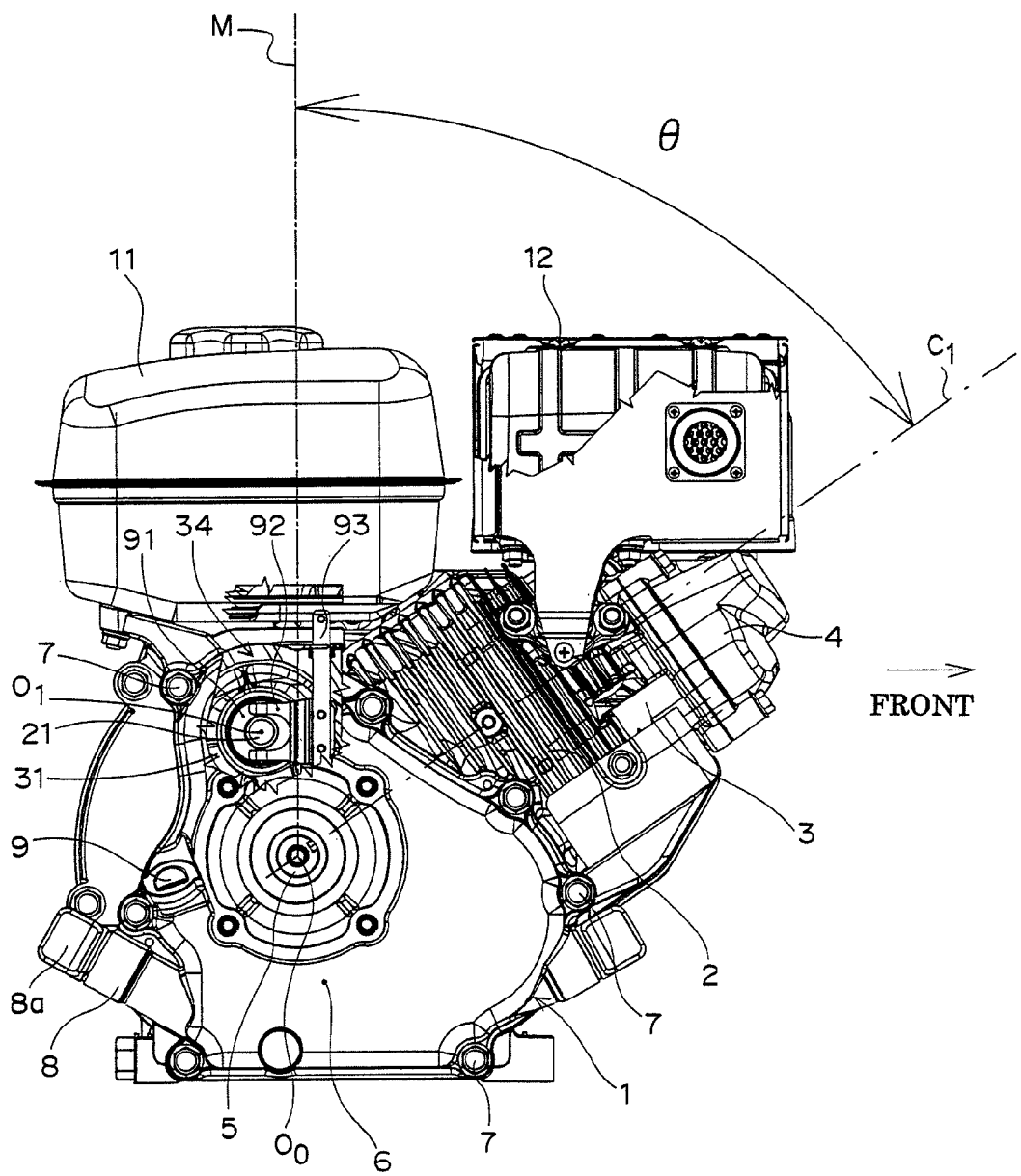
FIG. 1 is a side view showing an engine with an inclined cylinder according to a first embodiment of the present invention in which part of a crankcase cover is cut out.

FIG. 1 is a side view in which the engine with the inclined cylinder is seen in the axial direction of a crankshaft 5. For convenience of description, the side toward which a cylinder 2 is inclined in the horizontal direction orthogonal to the substantially horizontal crankshaft 5 is regarded as the "front side", and the axial direction of the crankshaft 5 seen from the rear side of the engine is regarded as the "lateral direction (right and left direction)" of the engine.

In FIG. 1, the cylinder 2 is formed on an upper surface in a front half part of a crankcase 1 integrally with the crankcase 1, and a cylinder head 3 and a head cover 4 are successively fastened to the cylinder 2. A center line C1 of the cylinder 2 is inclined toward the front side by a fixed angle θ (such as 55 to 60 degrees) relative to a vertical line M intersecting with an axis O0 of the crankshaft 5. A crankcase cover 6 is fastened onto a right end surface in the lateral direction (axial direction of the crankshaft 5) of the crankcase 1 by a plurality of bolts 7 (some of the bolts are given the reference numerals in the figure). A right end of the crankshaft 5 protrudes outward from the crankcase cover 6 as an output shaft part. A fuel tank 11 is arranged on the upper side of a rear half part of the crankcase 1, and an exhaust muffler 12 is arranged on the upper side of the cylinder head 3 and the head cover 4.

An oil gauge attachment portion 8 is opened in a lower rear end of the crankcase 1, and an oil gauge 8a is inserted from the oil gauge attachment portion 8 into the crankcase 1. Further, a sensor attachment portion (in a non-opened state) 9 into which an oil level sensor provided with a float can be inserted and fixed is formed on the upper side of the oil gauge attachment portion 8 as an option. In this sensor attachment portion 9, an opening is formed by mechanical processing or the like in a case where the oil level sensor is attached.

Figure 2:
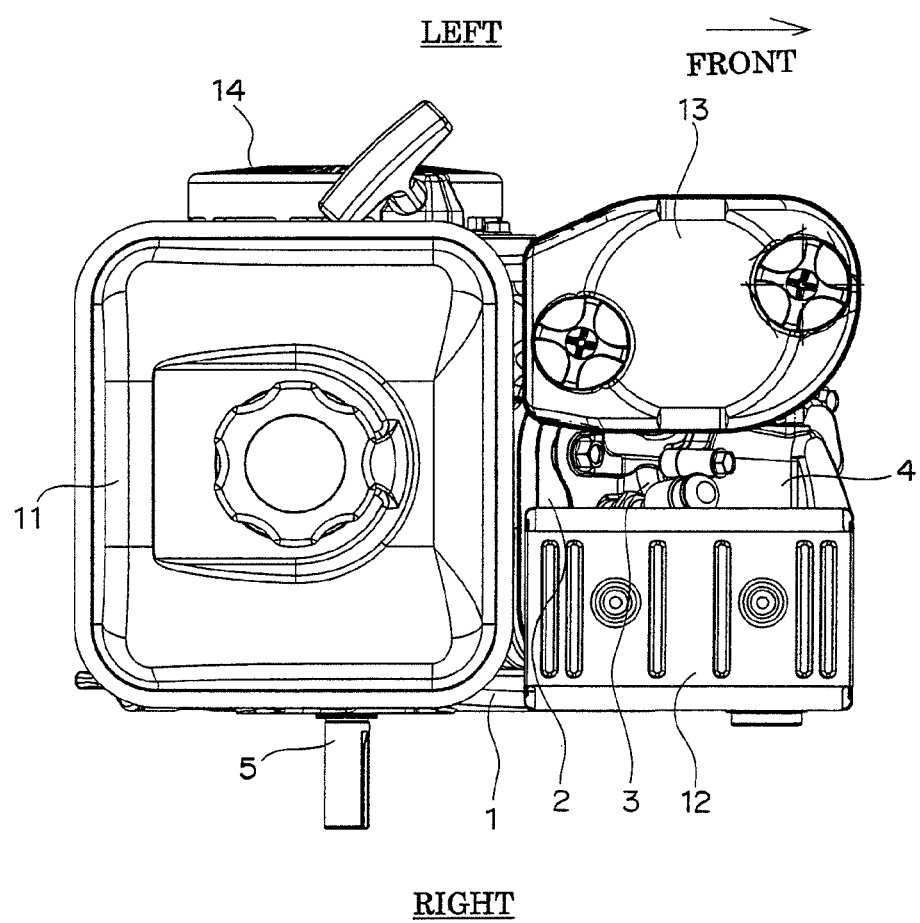
FIG. 2 is a plan view of the engine with the inclined cylinder of FIG. 1.

FIG. 2 is a plan view of FIG. 1, the fuel tank 11 is arranged on the upper side of the rear half part of the crankcase 1 and is formed into a substantially rectangular shape in plan view. The exhaust muffler 12 is arranged on the upper side of the cylinder head 3 and the head cover 4 in line with an air cleaner 13 in the lateral direction. For example, the exhaust muffler 12 is arranged on the right side and the air cleaner 13 is arranged on the left side. A recoil starter 14 is provided on the left side of the crankcase 1.

Figure 3:
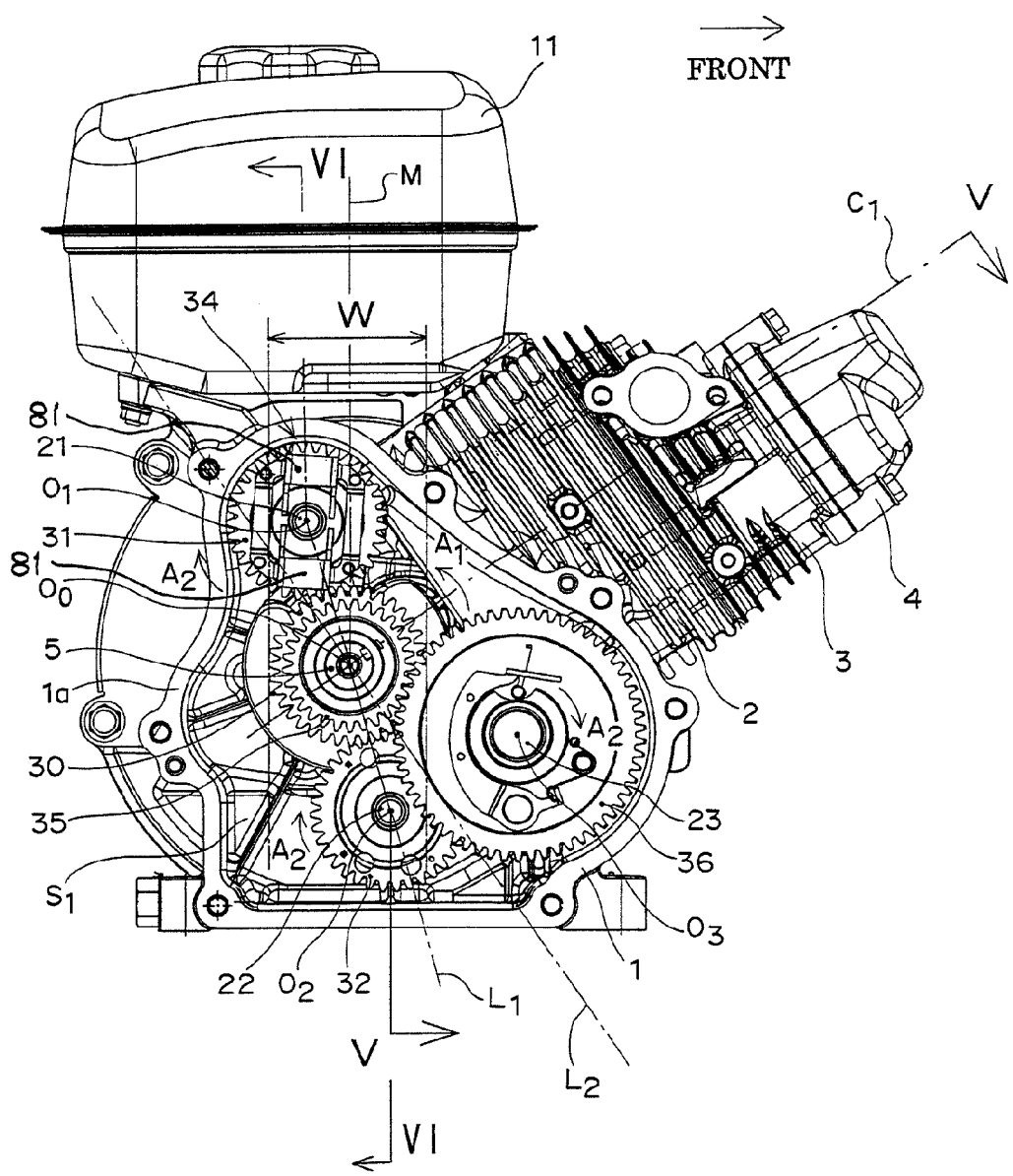
FIG. 3 is a side view showing the engine with the inclined cylinder of FIG. 1 in which the crankcase cover, an exhaust muffler, and an air cleaner are removed.

FIG. 3 is a side of the engine in which the crankcase cover 6, the exhaust muffler 12, and the air cleaner 13 of FIG. 1 are removed. In the crankcase 1, two first and second balancer shafts 21, 22 and a cam shaft 23 for driving intake and discharge valves are arranged substantially in parallel to the crankshaft 5.

A drive mechanism for the first and second balancer shafts 21, 22 includes one drive gear 30 for balancer secured to the crankshaft 5, and first and second driven gears 31, 32 for balancer respectively secured to the balancer shafts 21, 22 and meshed with the drive gear 30 for balancer. The first and second driven gears 31, 32 have a gear structure of the same diameter and the same number of teeth as the drive gear 30 for balancer. That is, by respectively transmitting mechanical force from the crankshaft 5 to the first and second balancer shafts 21, 22 via the drive gear 30 for balancer and the first and second driven gears 31, 32 for balancer, the first and second balancer shafts 21, 22 are rotated in the opposite direction A2 to the rotation direction A1 of the crankshaft 5 at the same rotation speed as the crankshaft 5.

The first driven gear 31 for balancer also has a function as a governor gear. Although described in detail later, a flyweight type governor mechanism 34 is installed onto an end surface of the first driven gear 31 for balancer.

A drive mechanism of the cam shaft 23 includes a cam driven gear 35 secured to the crankshaft 5, and a cam driven gear 36 secured to the cam shaft 23 and meshed with the cam drive gear 35. The cam driven gear 36 has a diameter and the number of teeth which are twice more than the cam drive gear 35. That is, the cam shaft 23 is rotated in the opposite direction A2 to the rotation direction A1 of the crankshaft 5 at rotation speed which is half of the crankshaft 5.

(Layout of Both Balancer Shafts 21, 22 and Cam Shaft 23)

In the present embodiment, the first and second balancer shafts 21, 22 are arranged at positions regulated by the following items (a) to (e) when seen from the side of the engine, that is, seen in the axial direction of the crankshaft 5.

(a) In FIG. 3, an axis O1 of the first balancer shaft 21 (hereinafter, referred to as the "first balancer axis") and an axis O2 of the second balancer shaft 22 (hereinafter, referred to as the "second balancer axis") are arranged so as to be divided into both the sides of a center line C1 of the cylinder 2 (hereinafter, referred to as the "cylinder center line"). As a matter of course, since both the driven gears 31, 32 and the drive gear 30 have the same diameter and the same number of teeth, the first balancer axis O1 and the second balancer axis O2 are positioned at an equal distance away from the crankshaft axis O0.

(b) Both the balancer shafts 21, 22 are arranged in such a manner that the first balancer axis O1 is positioned on the upper side of the crankshaft axis O0 and the second balancer axis O2 is positioned on the lower side of the crankshaft axis O0.

(c) The first and second balancer shafts 21, 22 are arranged in such a manner that the first balancer axis O1 and the second balancer axis O2 have a phase angle difference of substantially 180 degrees between the balancer shafts 21,22 around the crankshaft axis O0. In other words, the crankshaft axis O0 and both the balancer axes O1, O2 are positioned on the same straight line L1 when seen in the axial direction of the crankshaft 5. In this case, the straight line L1 on which the three axes O0, O1, O2 are aligned is deviated from a straight line L2 intersecting with the crankshaft axis O0 by a fixed angle (such as 19 degrees) clockwise. The straight line L2 is orthogonal to the cylinder center line C1 of the cylinder 2. Thereby, the first balancer axis O1 on the upper side and the second balancer axis O2 on the lower side are set so as to come closer to the vertical line M intersecting with the crankshaft axis O0 in the front and rear direction.

(d) The first balancer axis O1 and the second balancer axis O2 are arranged within a diameter range (range in the front and rear direction) W of the drive gear 30 for balancer in the front and rear direction.

(e) The first balancer axis O1 on the upper side is positioned on the rear side of the vertical line M intersecting with the crankshaft axis O0 within the diameter range W of the drive gear 30 for balancer, and the second balancer axis O2 on the lower side is positioned on the front side of the vertical line M intersecting with the crankshaft axis O0 within the diameter range W of the drive gear 30 for balancer.

The cam shaft 23 is arranged in such a manner that an axis O3 thereof is positioned between the second balancer axis O2 on the lower side and a lower end of the cylinder 2.

As described above, by arranging the second balancer shaft 22 on the lower side in such a manner that the axis O2 thereof is placed on the front side of the crankshaft axis O0, a sufficiently wide space portion S1 for arrangement of the oil level sensor, the space portion being capable of accommodating the float of the oil level sensor and the like is ensured in the crankcase 1 on the rear side of the second balancer shaft 22.

Figure 5:
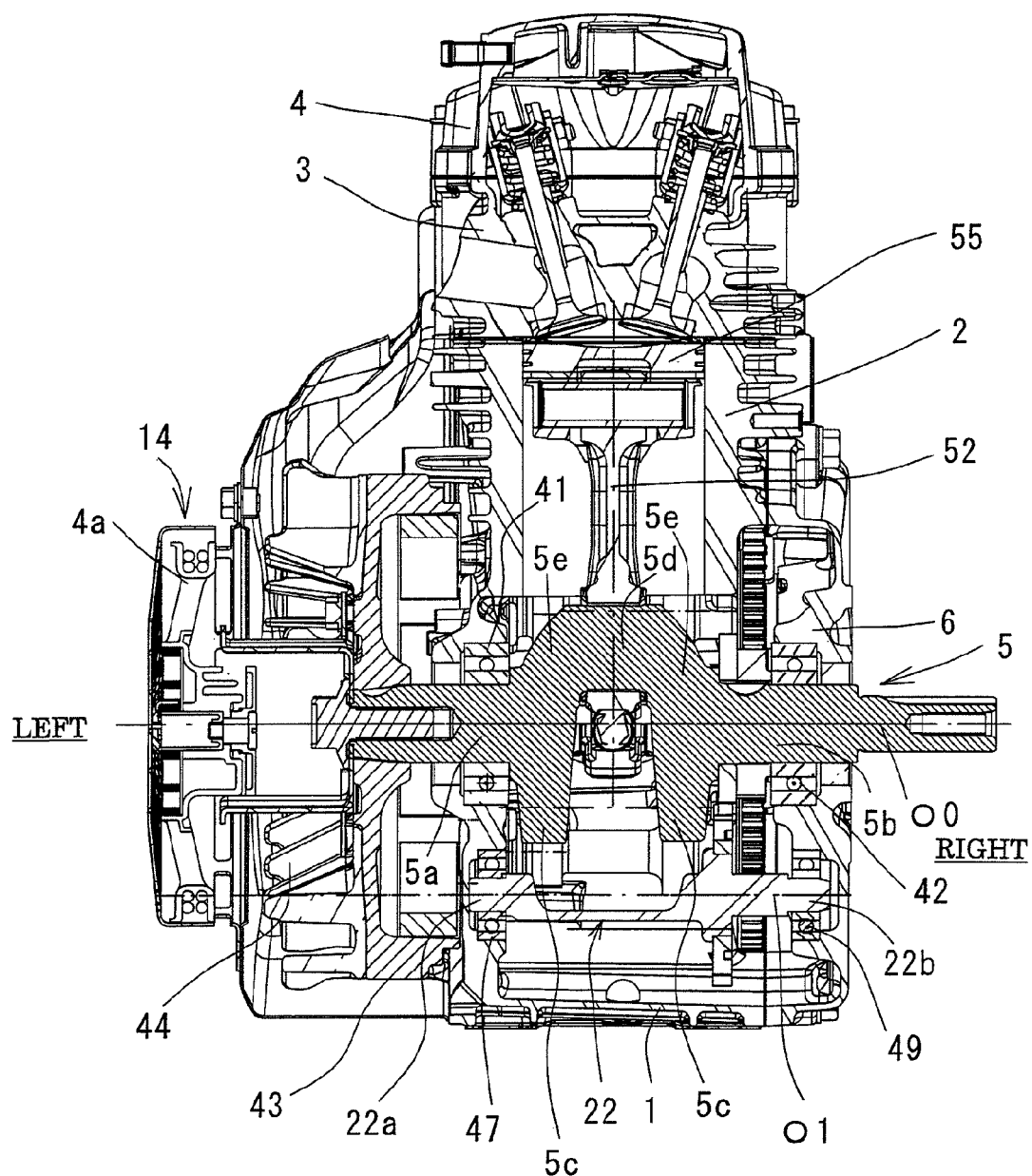
FIG. 5 is a sectional view by the line V-V of FIG. 3.

FIG. 5 is a sectional view by the line V-V of FIG. 3. As already known, the crankshaft 5 includes left and right journal portions 5a, 5b, a pair of right and left crank arms 5e, and a crank pin 5d supported by both the crank arms 5e. The left journal portion 5a is rotatably supported on a left side wall of the crankcase 1 via a bearing 41, and the right journal portion 5b is rotatably supported on the crankcase cover 6 via a bearing 42. A flywheel 43, a cooling fan 44, and a pulley 14a of the recoil starter 14 are secured to a left end of the crankshaft 5. A recess portion for attachment of a ring gear 43a (refer to FIG. 17) for the starter is formed on an outer peripheral surface of the flywheel 43.

Figure 6:
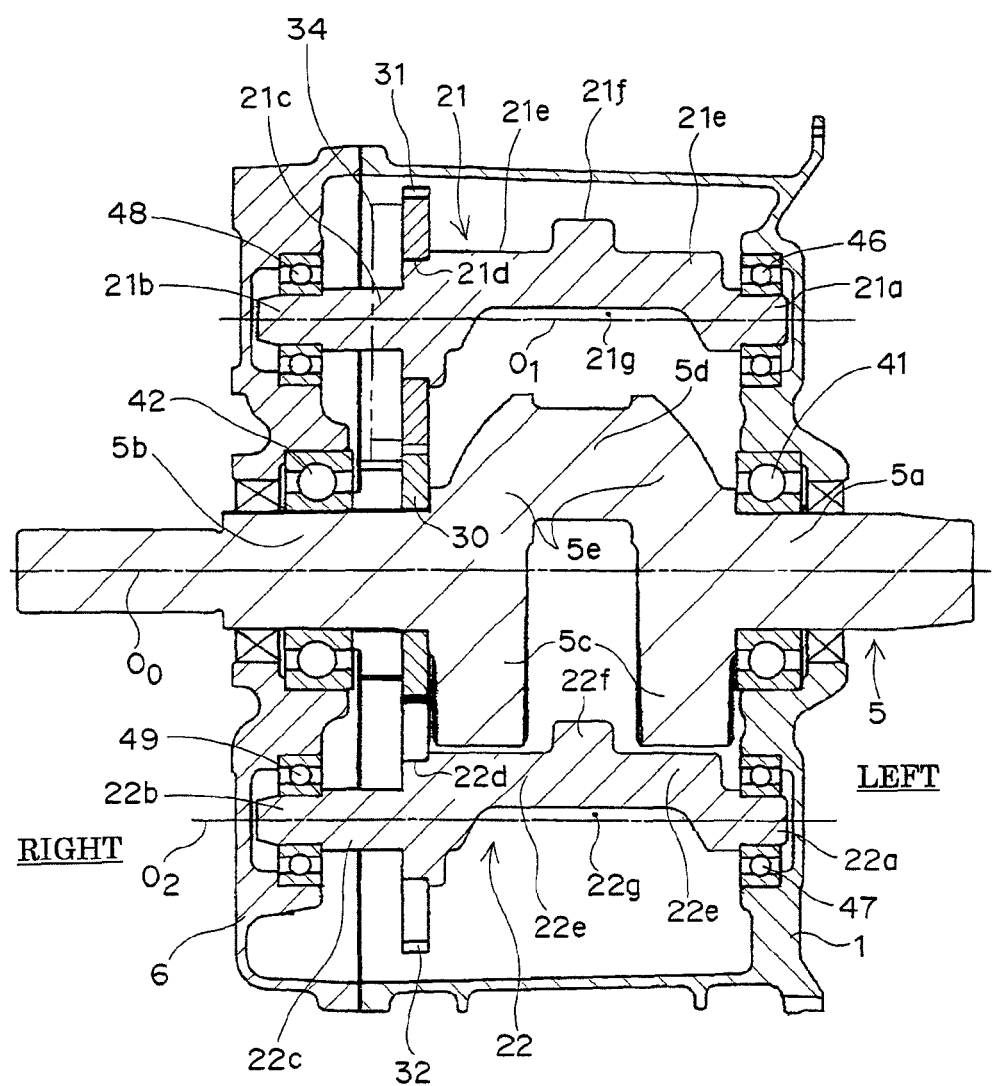
FIG. 6 is a sectional view by the line VI-VI of FIG. 3 in which a governor mechanism is omitted.

FIG. 6 is a sectional view by the line VI-VI of FIG. 3 (view seen from the front side). Left journal portions 21a, 22a of the first and second balancer shafts 21, 22 are respectively rotatably supported on the left side wall of the crankcase 1 via bearings 46, 47, and right journal portions 21b, 22b are respectively rotatably supported on the crankcase cover 6 via bearings 48, 49.

(Shape of Balancer Shafts 21, 22)

Figure 13:
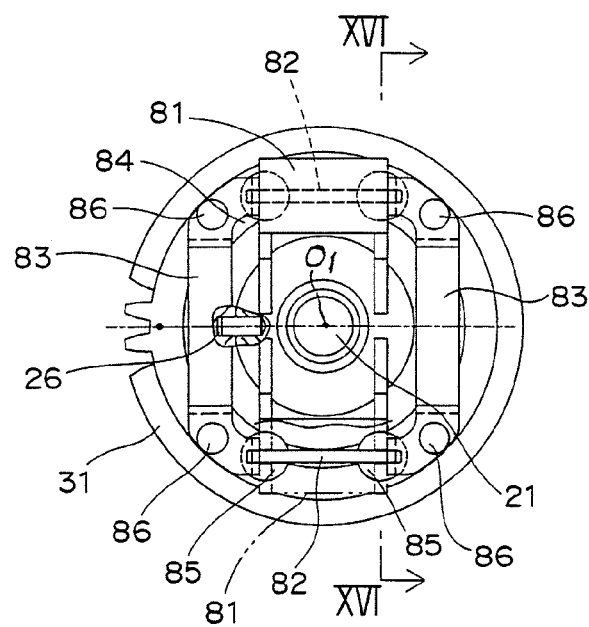
FIG. 13 is a XIII-arrow view of FIG. 12.

In FIG. 6, the first balancer shaft 21 and the second balancer shaft 22 are common parts or members having the same shape. Extended shaft portions 21c, 22c for governor arrangement are respectively formed on the left side of the right journal portions 21b, 22b, and the first and second driven gears 31, 32 for balancer are respectively fitted to annular gear attachment surfaces 21d, 22d formed on the left side of the extended shaft portions 21c, 22c. As shown in FIG. 13, the first driven gear 31 is positioned and fixed by a positioning pin 26 in the rotation direction by a predetermined rotation angle relative to the first balancer shaft 21. The second driven gear 32 of FIG. 6 is similarly positioned.

Figure 10:
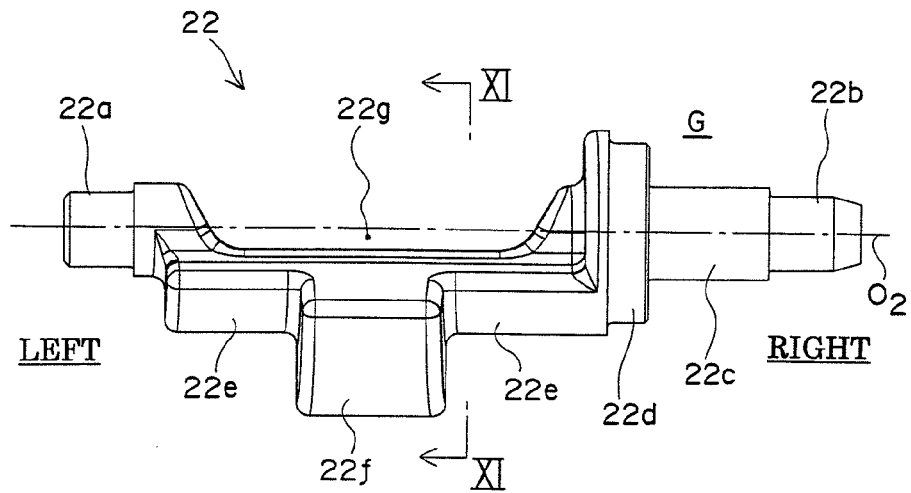
FIG. 10 is a front view of a second balancer shaft.

FIG. 10 is a front view of the second balancer shaft 22 arranged on the lower side. As described above, the second balancer shaft 22 includes the left and right journal portions 22a, 22b, the extended shaft portion 22c, and the annular gear attachment surface 22d, and also integrally includes a first step weight portion 22e formed into a crank shape between this gear attachment surface 22d and the left journal portion 22a, and a second step weight portion 22f formed on an outer peripheral surface in a laterally center part of the first step weight portion 22e.

The first step weight portion 22e is formed into a crank shape, so as to have gravity center deviated (eccentrically-placed) in one direction in the radial direction from the second balancer axis O2, and to have a recess portion 22g recessed on the opposite side of the deviation direction, which is on the side of the second balancer axis O2. The second step weight portion 22f further protrudes in the same direction as the deviation direction of the first step weight portion 22e from the outer peripheral surface of the first step weight portion 22e.

Figure 11:
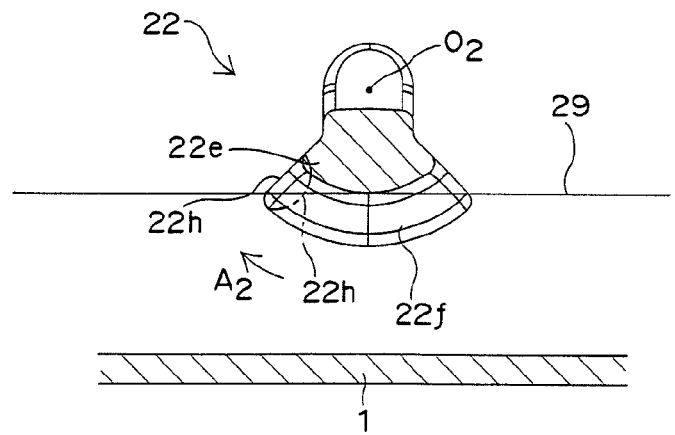
FIG. 11 is a sectional view by the line XI-XI of FIG. 10.

FIG. 11 is a sectional view by the line XI-XI of FIG. 10. The first step weight portion 22e is formed into a sector or fan shape taking the second balancer axis O2 as a sector pivot when seen in the axial direction, and an open angle (center angle) thereof is for example substantially 90 degrees. The second step weight portion 22f is also formed into a sector or fan shape taking the second balancer axis O2 as a sector pivot when seen in the axial direction, and an open angle thereof is 90 degrees which is the same as the first step weight portion 22e.

The vicinity of an outer end in the radial direction of the sector shape second step weight portion 22f is for example soaked into an oil reservoir 29 in the crankcase 1. Thereby, an end surface 22h on the side of the rotation direction A2 of the second step weight portion 22f functions as an oil pull-up surface. It should be noted that in order to improve the function as the oil pull-up surface 22h, the end surface 22h can be formed into an arc recess shape as shown by an imaginary line so as to improve oil pull-up efficiency.

Figure 12:
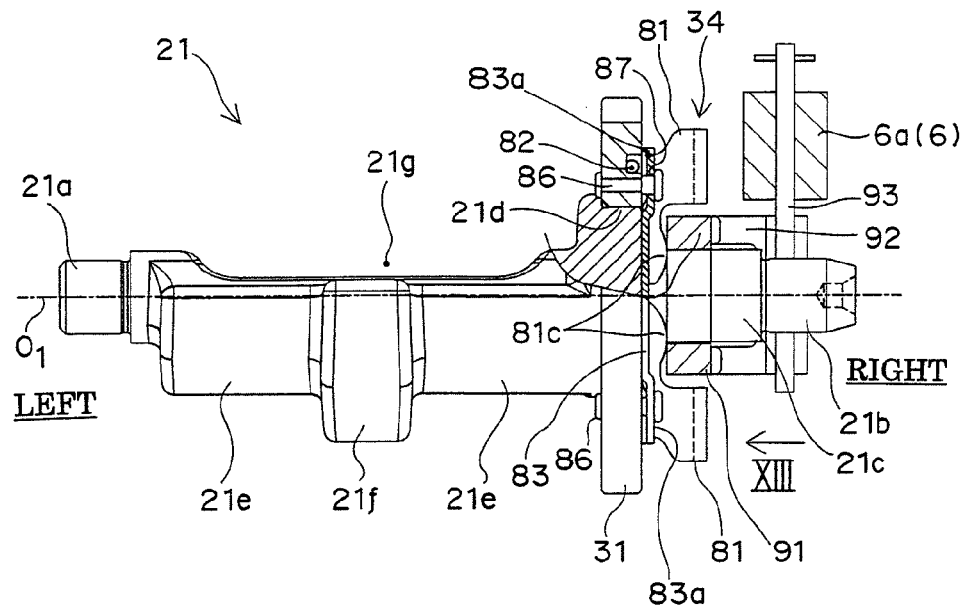
FIG. 12 is a partially sectional front view of a first balancer shaft provided with the governor mechanism.

FIG. 12 is a partially sectional front view showing the first balancer shaft 21 arranged on the upper side. The common parts having the same shape as the second balancer shaft 22 are used as described above. That is, the first balancer shaft 21 integrally includes the left and right journal portions 21a, 21b, the extended shaft portion 21c for the governor arrangement formed on the left side of the right journal portion 21b, the annular gear attachment surface 21d formed on the left side of the extended shaft portion 21c, a first step weight portion 21e having a sector shape section, the first step weight portion 21e being formed into a crank shape between this gear attachment surface 21d and the left journal portion 21a, a second step weight portion 21f having a sector shape section, the second step weight portion 21f being formed on an outer peripheral surface in a laterally center part of the first step weight portion 21e, and a recess portion 21g.

Figure 7:
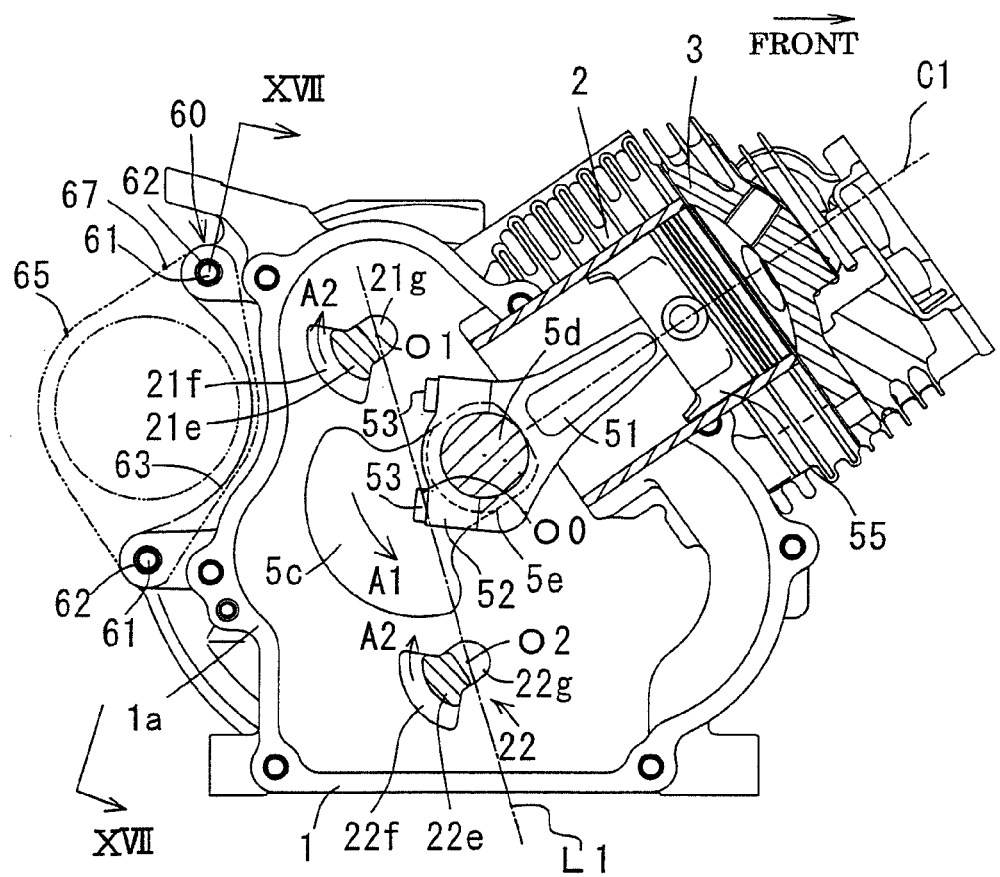
FIG. 7 is a schematic vertically-sectional view of the engine with the inclined cylinder of FIG. 1 showing a relationship between rotation positions of a crankshaft and both balancer shafts at the time of a piston top dead center.

FIG. 7 shows a positional relationship between a weight portion 5c of the crankshaft 5 and the weight portions 21e, 21f, 22e, 22f of both the balancer shafts 21, 22 at the time of a top dead center of a piston 55. The weight portion 5c of the crankshaft 5 is directed on the direct opposite side of the cylinder 2 as already known. The first and second step weight portions 21e, 21f, 22e, 22f of both the balancer shafts 21, 22 are directed substantially in parallel to and in the same direction as the weight portion 5c of the crankshaft 5. Taking such a positional relationship as a premise, size in the radial direction of the first and second step weight portions 21e, 21f, 22e, 22f of the first and second balancer shafts 21, 22 and size in the radial direction (depth) of the recess portions 21g, 22g are set as follows so as to be placed within such a range that the first and second balancer shafts 21, 22 are not brought into contact with the weight portion 5c of the crankshaft 5, a main bearing cap 52 of a connecting rod 51, and a cap bolt 53 thereof during an engine operation.

Figure 8:
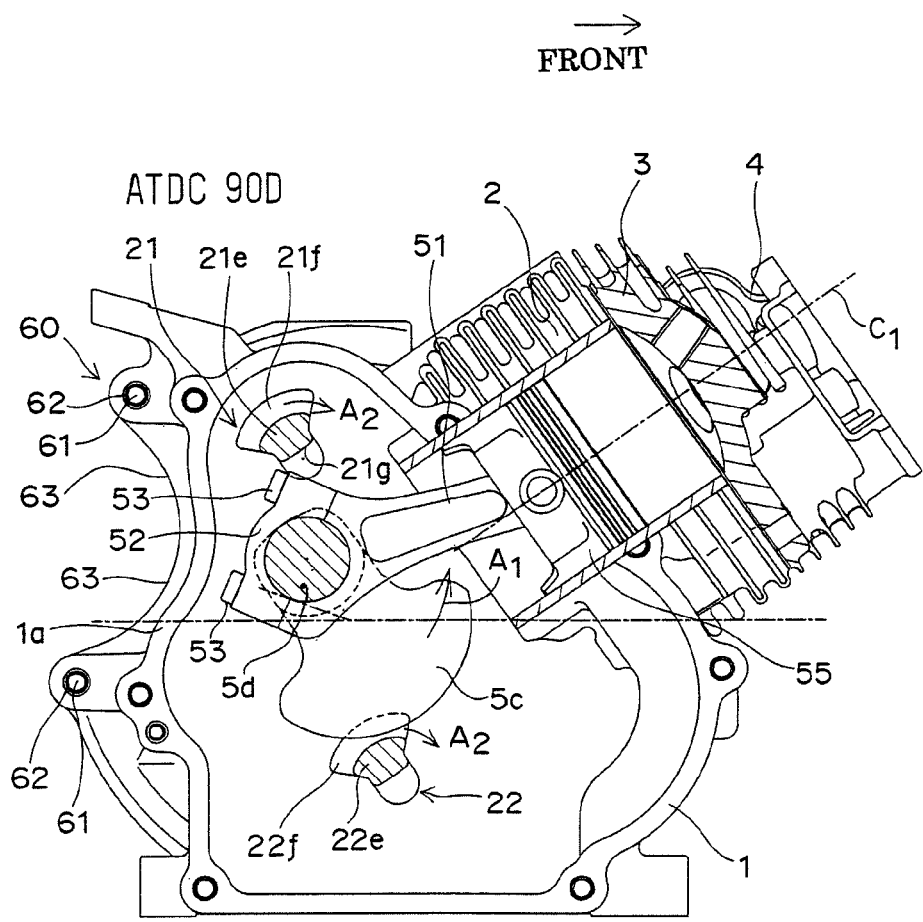
FIG. 8 is a schematic vertically-sectional view of the engine with the inclined cylinder of FIG. 1 showing a relationship between rotation positions of the crankshaft and both the balancer shafts when the crankshaft and both the balancer shafts are rotated by substantially 90 degrees from the piston top dead center.

FIG. 8 shows a state that the crankshaft 5 and both the balancer shafts 21, 22 are rotated by substantially 90 degrees of a crank angle from the top dead center of the piston 55. The weight portion 5c of the crankshaft 5 is moved by substantially 90 degrees in the arrow A1 direction, whereas the first and second step weight portions 21e, 21f, 22e, 22f of the balancer shaft 21, 22 are moved by substantially 90 degrees in the opposite direction A2 to the rotation direction A1 of the crankshaft 5. At this time, the main bearing cap 52 and the cap bolt 53 are brought close to the first balancer shaft 21 on the upper side. However, the depth of the recess portion 21g of the first balancer shaft 21 is set in such a manner that the main bearing cap 52 and the cap bolt 53 are not brought into contact with the first balancer shaft 21. That is, the depth of the recess portion 21g is set in such a manner that the main bearing cap 52 and the cap bolt 53 pass through a space of the recess portion 21g.

Regarding the second balancer shaft 22, the second step weight portion 22f thereof is overlapped with the weight portion 5c of the crankshaft 5 when seen in the axial direction. However, as in FIG. 6, the second step weight portion 22f is arranged in a space of the weight portion 5c (between the crank arms 5e) of the crankshaft 5 and formed with narrower width than the space of the weight portion 5c. Thereby, the second step weight portion 22f comes into the space of the weight portion 5c of the crankshaft 5, and the weight portion 5c of the crankshaft 5 and the second step weight portion 22f of the second balancer shaft 22 are not brought into contact with each other.

A radius of a sector shape of the first step weight portion 22e of the second balancer shaft 22 is set in such a manner that an outer peripheral surface of the first step weight portion 22e can be brought close to an outer peripheral surface of the weight portion 5c of the crankshaft 5 as far as possible while not being brought into contact with the outer peripheral surface.

Figure 9:
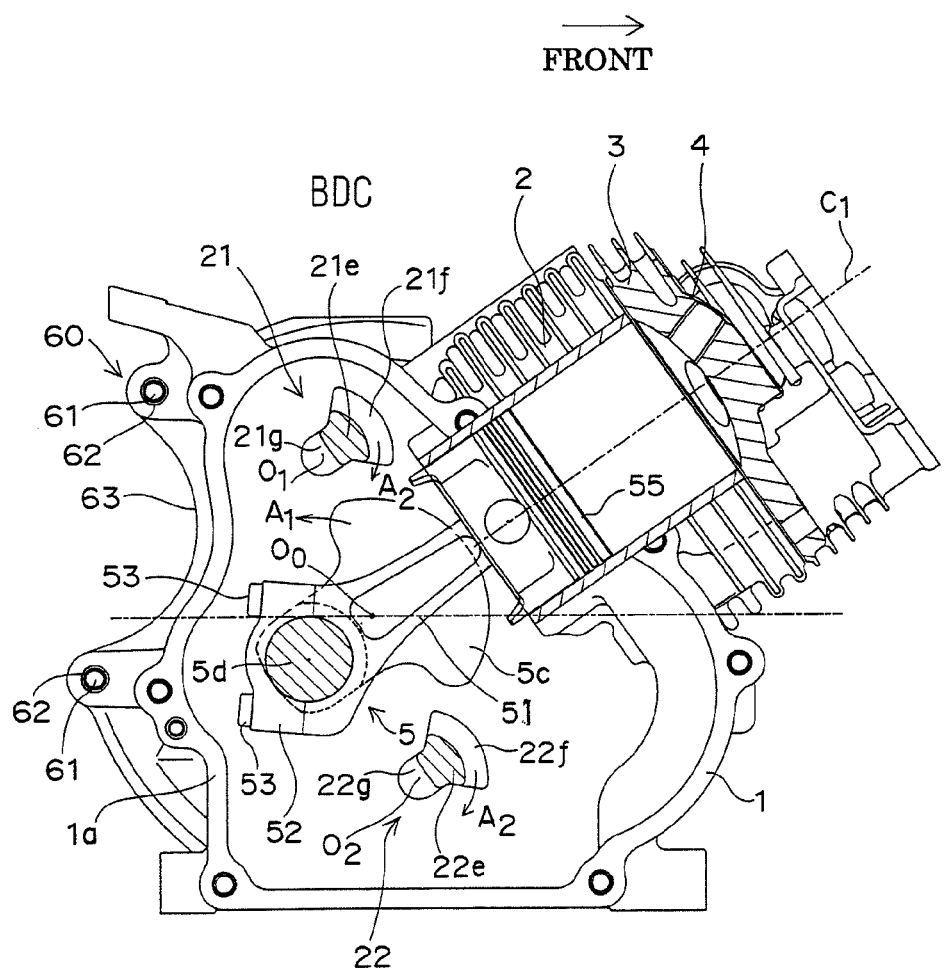
FIG. 9 is a schematic vertically-sectional view of the engine with the inclined cylinder of FIG. 1 showing a relationship between rotation positions of the crankshaft and both the balancer shafts at the time of a piston bottom dead center.

FIG. 9 shows a state of a bottom dead center of the piston 55. The weight portion 5c of the crankshaft 5 is directed to the cylinder 2, and the first and second step weight portions 21e, 21f, 22e, 22f of both the balancer shafts 21, 22 are also directed in parallel to and in the same direction as the weight portion 5c of the crankshaft 5.

It should be noted that when the crankshaft 5 and both the balancer shafts 21, 22 are further rotated by substantially 90 degrees of the crank angle from the bottom dead center of the piston 55 of FIG. 9, the positional relationship between the first and second step weight portions 21e, 21f, 22e, 22f of the balancer shafts 21, 22 and the weight portion 5c of the crankshaft 5 is opposite to a case of FIG. 8. Namely, in a state that the crankshaft 5 further rotates by substantially 90 degrees from the state of FIG. 9, the second step weight portion 21f of the first balancer shaft 21 is inserted in the space of the weight portion 5c of the crankshaft 5, whereas the main bearing cap 52 and the cap bolt 53 pass through a space of the recess portion 22g of the second balancer shaft 22.

As described above, the shape and the size of the first and second balancer shafts 21, 22 are determined in such a manner that the balancer shafts 21, 22 are not brought into contact with the crankshaft 5, the weight portion 5c thereof, the main bearing cap 52, the cap bolt 53, and the like. As a matter of course, weight and the like thereof are basically determined so as to eliminate unbalances due to inertia force and the like of the piston 55.

(Attachment Structure of Starter Motor)

In the engine with the inclined cylinder of the present embodiment, as shown in FIG. 7, a starter motor attachment portion 60 is formed on a rear wall 1a of the crankcase 1 integrally with the crankcase 1 in such a manner that the engine can also be manufactured with a specification that a starter motor is provided.

The starter motor attachment portion 60 is formed so as to protrude rearward from the rear wall 1a of the crankcase 1, and a pair of female screw holes (attachment holes) 61 is formed so as to be spaced from each other substantially in the up and down direction, and an arc shape recess portion 63 recessed on the front side is formed between the upper and lower female screw holes 61 in order to decrease the size in the front and rear direction of the crankcase 1 and to stabilize an attachment state of a starter motor 65.

Figure 17:
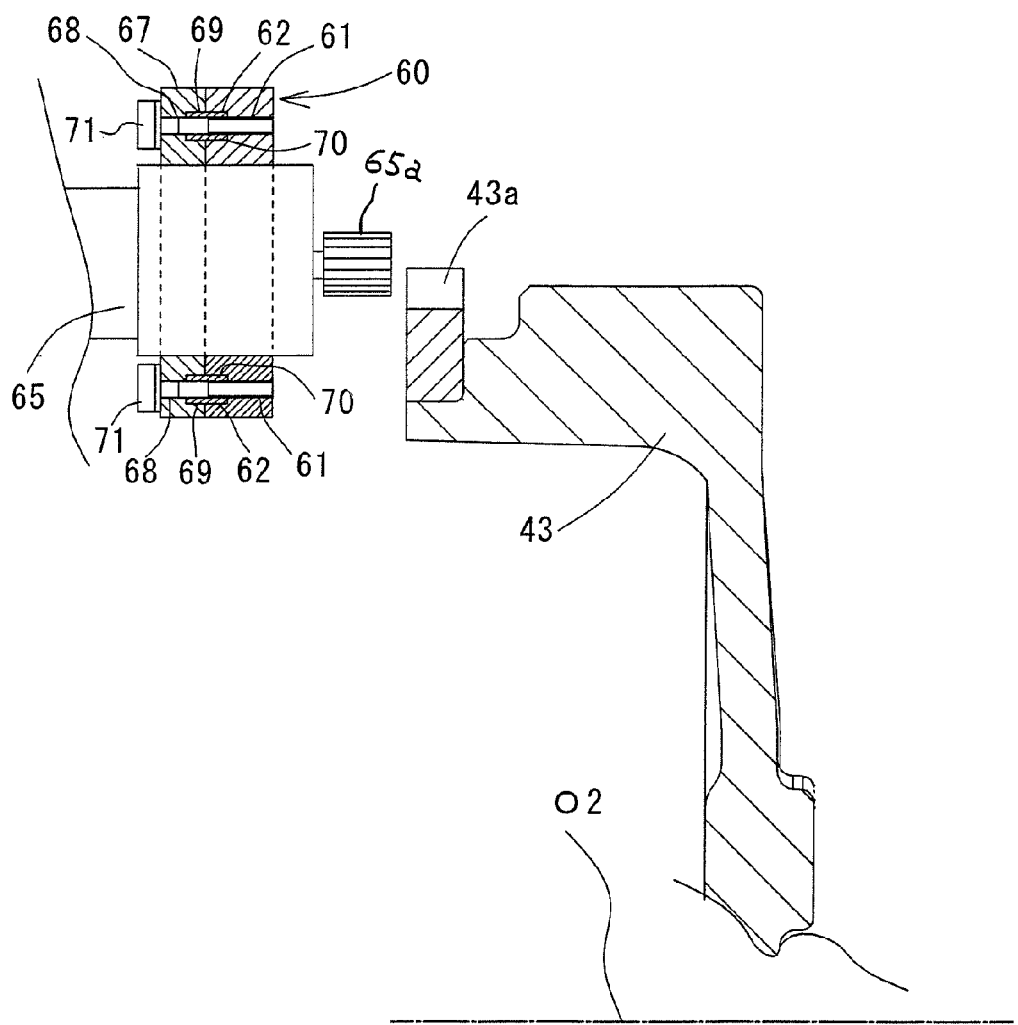
FIG. 17 is an enlarged sectional view showing a section by the line XVII-XVII of FIG. 7 in which a starter motor is attached.

FIG. 17 is a view corresponding to a section by the line XVII-XVII of FIG. 7, the view showing a state that the starter motor 65 is attached. A plural of positioning holes 62 is respectively formed in the female screw holes 61 coaxially with the female screw holes 61. Each of the positioning holes 62 has a larger inner diameter than an inner diameter of the female screw hole 61. Meanwhile, a plural of in bolt insertion holes 68 is formed in a flange portion 67 of the starter motor 65, and a plural of positioning holes 69 having a larger diameter than an inner diameter of the bolt insertion holes 68 is respectively formed in the bolt insertion holes 68. A diameter of the positioning hole 69 is the same as the diameter of the positioning hole 62 of the starter motor attachment portion 60. The positioning holes 68 are formed coaxially with the bolt insertion holes 68. That is, by fitting tubular positioning pins 70 into both the positioning holes 62, 69, the starter motor 65 is positioned in the direction substantially orthogonal to the crankshaft 5, and a pinion gear 65a of the starter motor 65 is positioned relative to the ring gear 43a of the flywheel 43. It should be noted that although a Bendix type (inertia slide type) of pinion gear is utilized as the pinion gear 65a, a so-called shift type pinion gear can also be utilized.

In a case where the starter motor 65 is attached, as shown by imaginary lines in FIG. 7, an outer peripheral surface of the starter motor 65 is matched with the arc shape recess portion 63, and as in FIG. 17, the flange portion 67 of the starter motor 65 is overlapped with the starter motor attachment portion 60. At this time, by fitting the tubular positioning pins 70 into both the positioning holes 62, 69, the starter motor 65 is positioned. By screwing bolts 71 inserted into the bolt insertion holes 68 and the tubular positioning pins 70 into the female screw holes 61 of the starter motor attachment portion 60, the starter motor 65 is fixed at a predetermined position.

(Structure of Governor)

Figure 14:
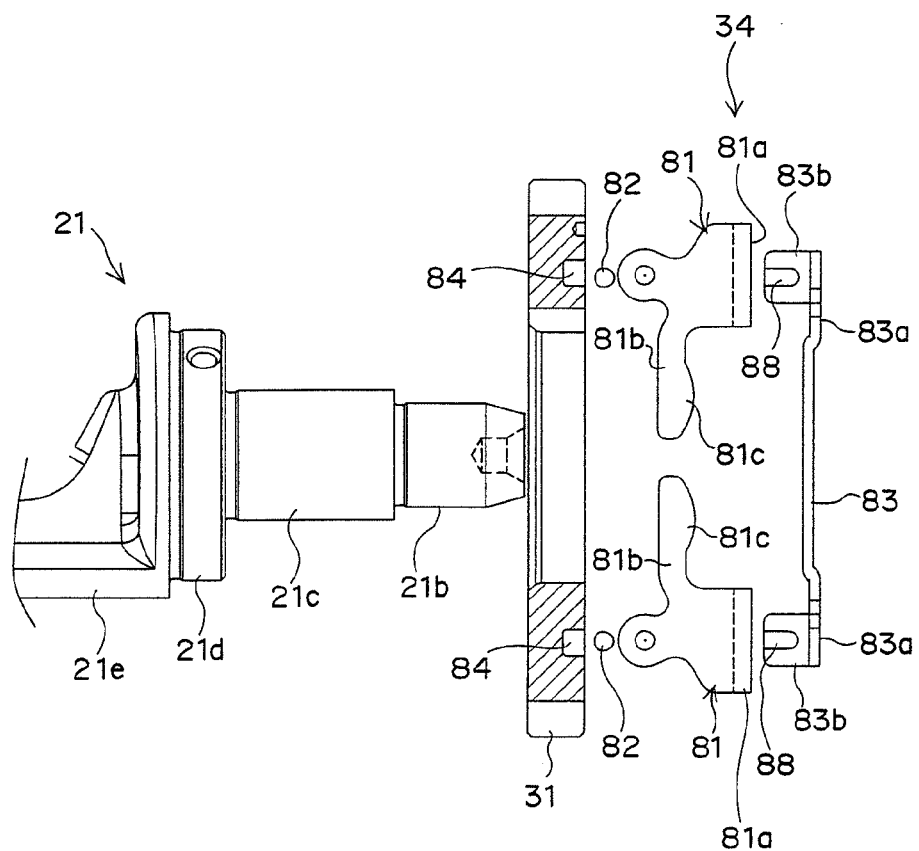
FIG. 14 is an enlarged front view showing part of FIG. 12 in which the governor mechanism is exploded.
Figure 15:
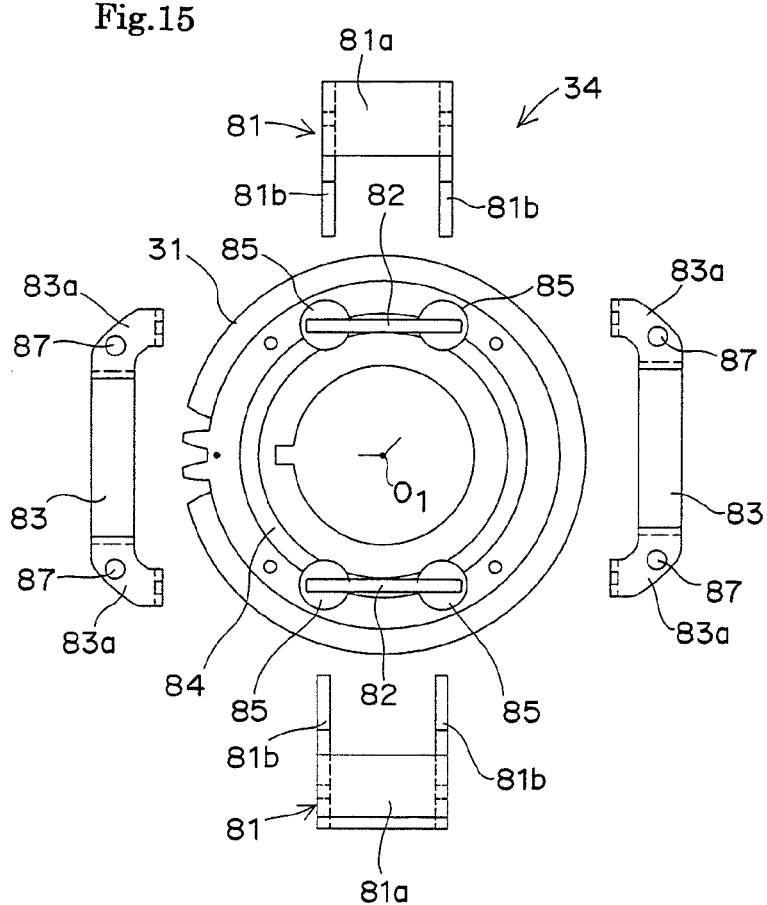
FIG. 15 is a XIII arrow view corresponding to FIG. 13 in which the governor mechanism is exploded.
Figure 16:
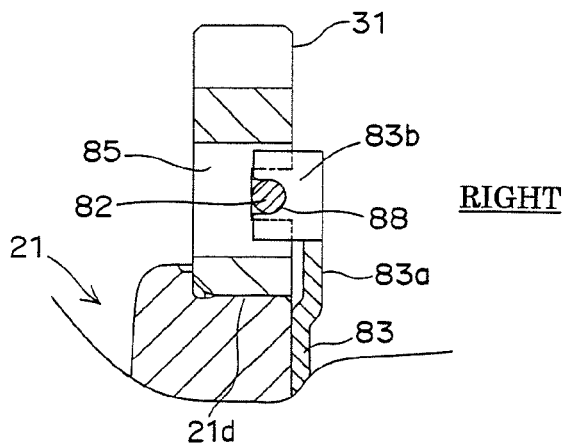
FIG. 16 is an enlarged sectional view showing part of a section by the line XVI-XVI of FIG. 13.

With FIGS. 12 to 15, a structure of the governor mechanism 34 arranged on the one end surface of the driven gear 31 of the first balancer shaft 21 will be described. FIG. 13 is a XIII-arrow view of FIG. 12, FIG. 14 is an exploded front view of the governor mechanism 34, FIG. 15 is an exploded side view in which the governor mechanism 34 is seen in the axial direction, and FIG. 16 is an enlarged sectional view showing part of a section by the line XVI-XVI of FIG. 13. In FIG. 14, this governor mechanism 34 includes a pair of flyweights 81, a pair of support pins 82 respectively pivotally supporting the flyweights 81, and a pair of holding members (holders) 83 fixing both the support pins 82. Both the support pins 82 are arranged in a recess portion 84 formed on the end surface of the first driven gear 31.

In FIG. 15, the recess portion 84 is formed into an annular shape taking the first balancer axis O1 as center, and both the support pins 82 are arranged substantially in parallel to each other, and arranged at symmetrical positions to each other with respect to the first balancer axis O1. Through holes 85 are formed in points where the support pins 82 are arranged. For more detail, the four through holes 85 are formed at points corresponding to both ends in the longitudinal direction of the support pins 82. Both the ends of the support pins 82 come into the through holes 85 from the recess portion 84.

Each of the flyweights 81 is made of sheet metal and includes a rectangular weight portion 81a, and a pair of arm portions 81b formed by bending both ends of the weight portion 81a. Base ends (ends on the side of the first balancer axis O1) of both the arm portions 81b are inserted into parts of the through holes 85 and pivotally supported on the support pins 82.

The pair of holding members 83 are also made of sheet metal, and elongated in the direction orthogonal to the support pins 82, and both ends 83a in the longitudinal direction are inclined into a dogleg shape. Further, as shown in FIG. 16, a bent portion 83b bent on the side of the first driven gear 31 is integrally formed in a front end of each of the ends 83a. A U-shaped groove 88 is formed in this bent portion 83b, and by fitting this U-shaped groove 88 to the support pin 82, the support pin 82 is fixed to the recess portion 84.

As shown in FIG. 15 rivet insertion holes 87 are formed in the ends 83a of the holding members 83 respectively. As shown in FIG. 12, the holding member 83 is fixed to the end surface of the first driven gear 31 by a rivet 86 inserted into the rivet insertion hole 87.

It should be noted that both the ends 83a of the holding member 83 are formed into stepwise shape via a step part and displaced so as to be away from the end surface of the driven gear 31

In addition to the flyweights 81, the holding members 83, and the like, the governor mechanism 34 includes a cylindrical or disc shape governor sleeve 91 fitted to the extended shaft portion 21c movably in the axial direction, a bifurcated pivot arm 92 abutted with a right end surface of this governor sleeve 91, and an arm shaft 93 to which this pivot arm 92 is secured. A left end surface of the governor sleeve 91 is abutted with action portions 81c of the flyweights 81. When the flyweights 81 are opened on the support pins 82 by rotation of the first balancer shaft 21, the governor sleeve 91 is pushed by the action portions 81c and moved rightward. The arm shaft 93 extends substantially vertically upward, is rotatably supported on a boss portion 6a formed in the crankcase cover 6, and further protrudes upward from the boss portion 6a.

Figure 4:
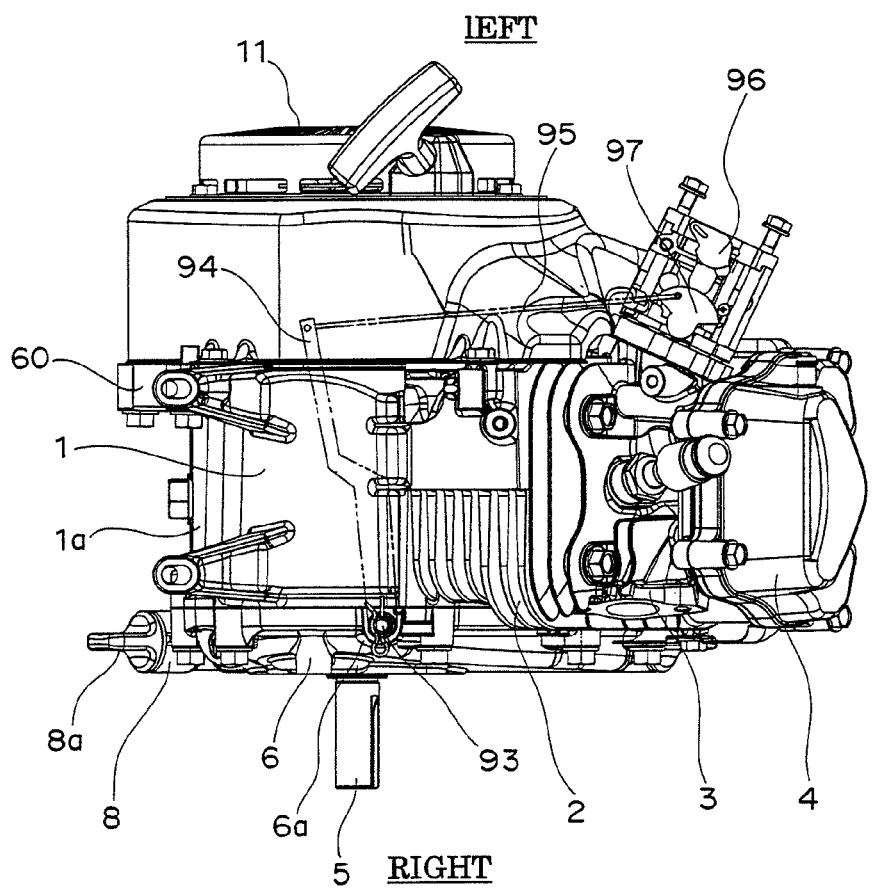
FIG. 4 is a plan view showing the engine with the inclined cylinder of FIG. 1 in which the crankcase cover, the exhaust muffler, the air cleaner, and a fuel tank are removed.

In FIG. 4, an operation arm 94 extending leftward on the upper side of the crankcase 1 as shown by imaginary lines is secured to an upper end of the arm shaft 93, and a left end of this operation arm 94 is coupled to a fuel adjustment lever 97 of a carburetor (or a throttle body) 96 via a coupling rod 95.

It should be noted that in the embodiment, the member expressed as the "crankcase cover 6" is one member substantially constituting the crankcase, which is included in the crankcase described in the claims.

(Operations and Effects of the Embodiment)

(1) When the engine is started by the recoil starter 14 shown in FIG. 2 or the starter motor 65 shown in FIG. 7, the crankshaft 5 is rotated in the arrow A1 direction and both the balancer shafts 21, 22 are rotated in the opposite direction A2 at the same rotation speed as the crankshaft 5 in FIG. 7. Inertia force generated by reciprocal motion of the piston 55 and rotation of the crankshaft 5 is eliminated by the weight portion 5c of the crankshaft 5 and the first and second step weight portions 21e, 21f, 22e, 22f of both the balancer shafts 21, 22. Thereby, vibration of the engine is suppressed.

(2) In FIG. 3, the flyweights 81 of the speed governor 34 are installed on the driven gear 31 of the first balancer shaft 21. Thus, when the rotation speed of the crankshaft 5 is increased, in proportional to this, the rotation speed of the driven gear 31 is increased, and the flyweights 81 are opened or moved outward in the radial direction around the support pins 82 by centrifugal force. Thereby, in FIG. 12, the action portions 81c of the flyweights 81 push front ends of the bifurcated pivot arm 92 rightward in the axial direction via the governor sleeve 91, and move the pivot arm 92 and the pivot arm shaft 93 around an axis of the pivot arm shaft 93. When the pivot arm shaft 93 is moved, in FIG. 4, the fuel adjustment lever 97 of the carburetor 96 is moved via the coupling rod 95. When the rotation speed of the crankshaft 5 reaches predetermined speed, as already known, by a balance between the centrifugal force of the flyweights 81 and spring force of a governor spring (not shown) for example, a throttle opening position is adjusted, or fuel is adjusted, so that the rotation speed of the crankshaft is adjusted or controlled.

(3) An attachment mechanism and a drive mechanism of the speed governor 34 are formed by utilizing the existing balancer shaft 21, the drive gear 30 for balancer and the driven gear 31 for balancer. Thus, there is no need for newly providing a governor shaft, a drive gear, and a driven gear exclusive to the speed governor, and the number of parts for the speed governor can be reduced and size of the crankcase (or the engine) can be decreased.

(4) The support pins 82 for the flyweights are arranged in the recess portion 84 of the driven gear 31. Thus, in comparison to a structure in which boss portions for supporting the flyweights projecting from an end surface of the driven gear are formed as in the conventional example, a projecting amount of the flyweights 81 from the end surface of the driven gear 31 can be reduced, so that size of the speed governor 34 in the axial direction can be decreased. A long distance from the support pins 82 to gravity centers of the flyweights 81 can be ensured and sufficient centrifugal force can be generated. Thus, size of the flyweights 81 themselves can be decreased.

(5) The recess portion 84 for attaching the support pins is formed into an annular shape. Thus, the recess portion 84 can be cut at the same time as a lathing work of the driven gear 31, so that a working process can be reduced. The recess portion 84 is formed on the entire periphery of the end surface of the driven gear 31. Thus, a significant thickness reducing effect can be obtained, so that weight of the driven gear 31 can be reduced.

(6) The first driven gear 31, the flyweights 81, and the like can be attached to the first balancer shaft 21 before attaching the crankcase cover 6. Thus, the crankcase cover 6 can be attached in a state that the driven gears 31, 32 and the like are not provided on the side of the crankcase cover 6. That is, at the time of attaching the crankcase cover 6, the crankcase cover 6 can be attached in a state that the first driven gear 31, the flyweights 81, and the like on the first balancer shaft 21 can be visually recognized, so that an assembling task of the speed governor 34 is easily performed.

(7) In the present embodiment, as in FIG. 3, the driven gear 31 of the first balancer shaft 21 has the same diameter and the same number of teeth as the drive gear 30. Thus, the first balancer shaft 21 is rotated at the same rotation speed as the crankshaft 5. That is, in comparison to a case where a shaft to which mechanical power is transmitted from the crankshaft while reducing the speed such as the cam shaft is utilized, large centrifugal force can be generated.

(8) In the present embodiment, the two first and second balancer shafts 21, 22 are arranged substantially at an immediately above position and an immediately below position in the vicinity of the crankshaft 5. Specifically, the axes O1, O2 of the first and second balancer shafts 21, 22 on the upper and lower sides are arranged within the range in the front and rear direction (diameter range) W of the drive gear 30 for balancer. Thus, although the two first and second balancer shafts 21, 22 are provided, the size in the front and rear direction of the crankcase 1 can be decreased.

(9) As shown in FIG. 3, since the axes O1, O2 of the first and second balancer shafts 21, 22 are arranged so as to have the phase angle difference of 180 degrees around the axis O0 of the crankshaft 5, efficiency in an assembling task of the first and second balancer shafts 21, 22 by a predetermined rotation angle can be improved, and the size of the crankcase 1 can be further decreased. That is, on assembling the first and second balancer shafts 21, 22, meshing marks of the driven gears 31, 32 of the first and second balancer shafts 21, 22 and the drive gear 30 of the crankshaft 5 can be easily matched with each other. Thus, both the balancer shafts 21, 22 can be easily set and assembled to a predetermined rotation angle relative to a rotation angle of the crankshaft and assembled.

[Other Embodiments]

Figure 18:
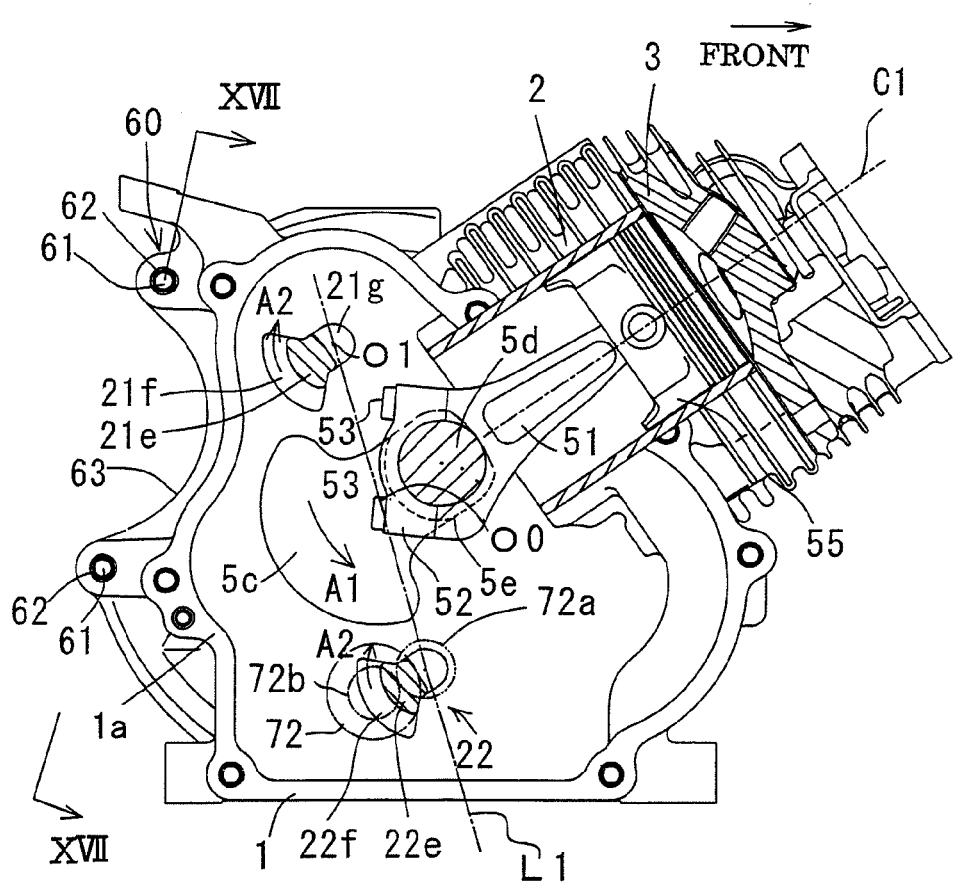
FIG. 18 is a schematic vertically-sectional view of a second embodiment of the present invention showing the engine with the inclined cylinder similar to FIG. 7.

(1) FIG. 18 shows an engine with an inclined cylinder according to a second embodiment of the present invention. In a case where the engine is enlarged, instead of the oil pull-up function of utilizing the second balancer shaft 22 on the lower side, or in addition to the oil pull-up function, there is a need for providing an oil pump. The engine shown in FIG. 18 includes an oil pump 72 in the crankcase 1, includes a pump drive gear 72a and a pump driven gear 72b. The pump drive gear 72a meshed with the pump driven gear 72b of the oil pump 72 is formed in the second balancer shaft 22 on the lower side. Thereby, in a lower part of the crankcase 1, the oil pump 72 can be driven by a simple transmission mechanism. Although the oil pump 72 is arranged on the rear side of the balancer shaft 22 on the lower side when seen from the side in FIG. 18, the oil pump 72 may be arranged on the front side or the lower side of the balancer shaft 22 on the lower side.

It should be noted that as a mechanical power transmission mechanism between the second balancer shaft 22 and a pump shaft, a mechanism other than the above gear type transmission mechanism may be adopted.

Figure 19:
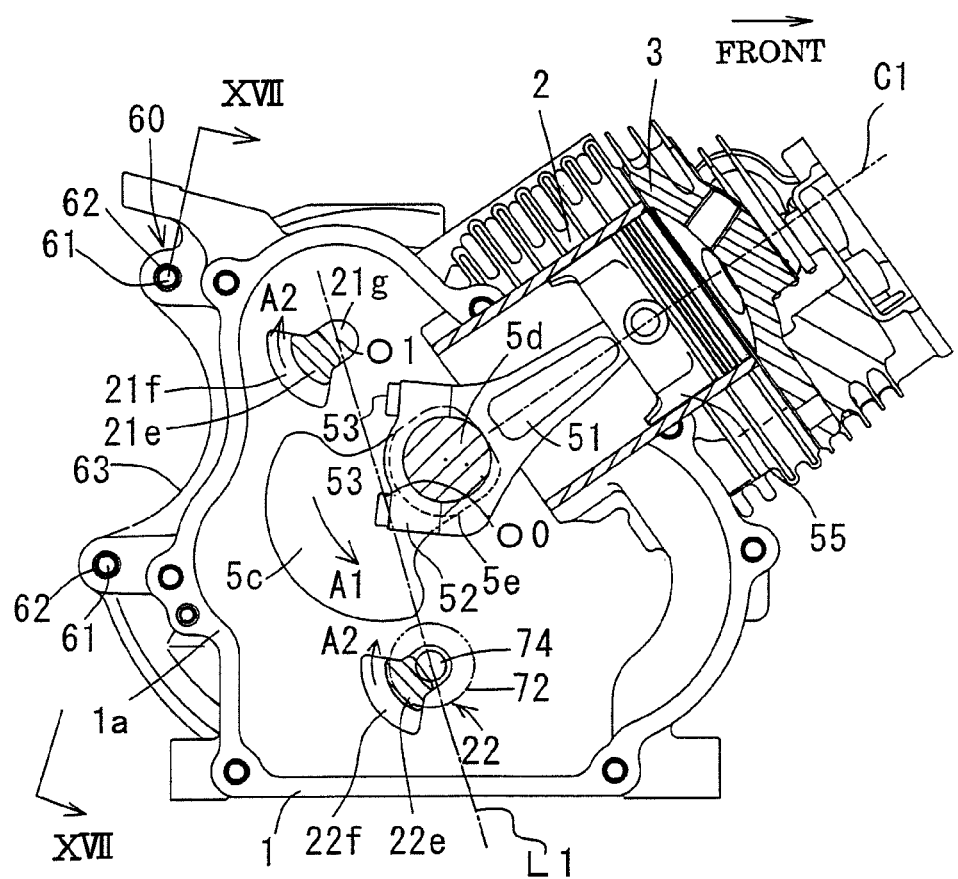
FIG. 19 is a schematic vertically-sectional view of a third embodiment of the present invention showing the engine with the inclined cylinder similar to FIG. 7.

(2) FIG. 19 shows an engine with an inclined cylinder according to a third embodiment of the present invention. Although the engine includes the oil pump 72 as well as the second embodiment, a pump shaft 74 of the oil pump 72 is arranged coaxially with the second balancer shaft 22 on the lower side, and integrally connected not by the gear transmission mechanism but by a coupling mechanism.

Figure 20:
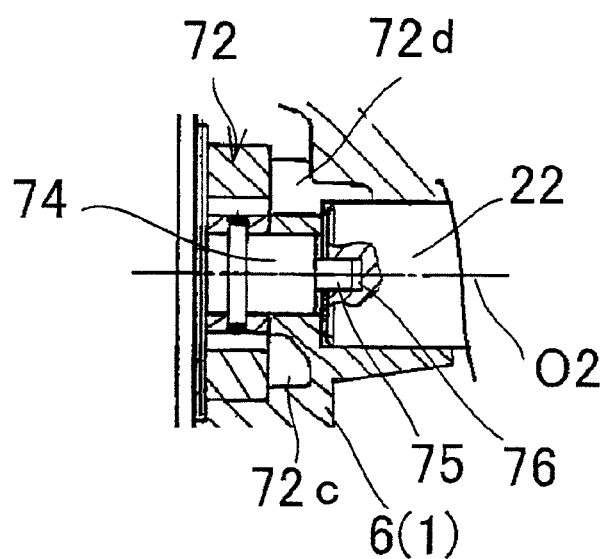
FIG. 20 is a sectional view of an oil pump part in the third embodiment.
Figure 21:
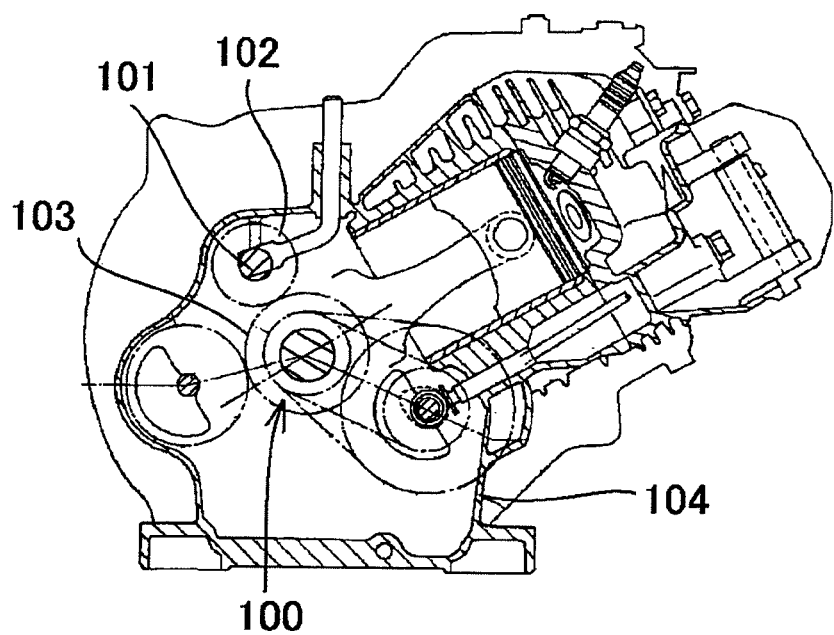
FIG. 21 is a sectional view of a prior art.

FIG. 20 is a sectional view of the oil pump (trochoid pump) 72 of FIG. 19 in which an axis of the pump shaft 74 is set on the same straight line as the axis O2 of the second balancer shaft 22 on the lower side. The coupling mechanism is formed by a projection 75 formed on an end surface of the pump shaft 74, the projection extending in the radial direction, and a radial groove 76 formed on an end surface of the second balancer shaft 22 and meshed with the projection 75. A so-called Oldham's coupling mechanism is provided.

In the oil pump 72, a pump casing part is formed integrally with the crankcase cover 6 (or the crankcase 1), and an intake port and a discharge port of the oil pump 72 respectively communicate with an oil intake passage 72c and an oil supply passage 72d formed in a wall of the crankcase cover 6.

According to the third embodiment, since there is no need for the gear transmission mechanism, the number of parts for driving the pump can be reduced.

It should be noted that as a structure in which the pump shaft 74 is integrally connected to the balancer shaft 22, the pump shaft 74 may be integrated with the second balancer shaft 22.

(3) Although the present invention is suitable for a single-cylinder engine, the present invention may also be applied to a multi-cylinder engine.

(4) The present invention may also be applied to an engine with a fuel injector besides an engine with an carburetor.

(5) The present invention can be variously modified and changed without departing from the spirit and the scope of the present invention described in the claims.

What is claimed is:

1. A speed governor for an engine having a drive gear on a crankshaft and a balancer shaft arranged substantially in parallel to the crankshaft, the speed governor comprising:
   a driven gear configured to transmit mechanical power from the drive gear to the balancer shaft;
   a plurality of support pins;
   a plurality of flyweights pivotally supported on the driven gear of the balancer shaft by the plurality of support pins; and
   an interlock mechanism for connecting the plurality of flyweights to a fuel feed portion for feeding fuel to a combustion chamber of the engine,
   wherein the driven gear has a recess portion on an end surface thereof, and the support pins supporting the flyweights are arranged in the recess portion,
   wherein the recess portion has an annular shape substantially concentric to the driven gear,
   wherein a plurality of through holes is formed in the driven gear,
   wherein each of the support pins has two ends in a longitudinal direction, and the through holes are respectively located at the ends of the support pins.

2. The speed governor of the engine of claim 1, further comprising:
   a plurality of holding members having U-shaped grooves,
   wherein the U-shaped grooves are fitted over the support pins, respectively, and the support pins are fixed in the recess portion of the driven gear.

3. An engine comprising:
   a combustion chamber;
   a crankshaft;
   a balancer shaft arranged substantially in parallel to the crank shaft;
   a drive gear provided on the crankshaft;
   a crankcase;
   a crankcase cover fastened to a side surface of the crankcase; and
   a speed governor comprising:
      (i) a driven gear configured to transmit mechanical power from the drive gear to the balancer shaft;
      (ii) a plurality of support pins;
      (iii) a plurality of flyweights pivotally supported on the driven gear of the balancer shaft by the plurality of support pins; and (iv) an interlock mechanism for connecting the plurality of flyweights to a fuel feed portion for feeding fuel to the combustion chamber, wherein the driven gear has a recess portion on an end surface thereof, and the support pins supporting the flyweights are arranged in the recess portion, wherein the recess portion has an annular shape substantially concentric to the driven gear, wherein a plurality of through holes is formed in the driven gear, wherein each of the support pins has two ends in a longitudinal direction, and the through holes are respectively located at the ends of the support pins, wherein the interlock mechanism includes an actuating member configured to be actuated by pivoting of the flyweights, wherein one end of the balancer shaft in an axial direction is supported on a side wall of the crankcase, and the other end of the balancer shaft is supported on a crankcase cover fastened to a side surface of the crankcase in the axial direction, and wherein the actuating member is supported on the crankcase cover.

4. The engine of claim 3, further comprising:

a plurality of holding members having U-shaped grooves, wherein the U-shaped grooves are fitted over the support pins, respectively, and the support pins are fixed in the recess portion of the driven gear.

* * * * *